United States Patent [19]

Frank

[11] 4,264,686
[45] Apr. 28, 1981

[54] GRAPHITE FELT FLOWTHROUGH ELECTRODE FOR FUEL CELL USE

[75] Inventor: Steven N. Frank, McKinney, Tex.

[73] Assignee: Texas Instruments Incorporated, Dallas, Tex.

[21] Appl. No.: 82,445

[22] Filed: Oct. 9, 1979

Related U.S. Application Data

[62] Division of Ser. No. 939,010, Sep. 1, 1978, abandoned.

[51] Int. Cl.³ .............................................. H01M 4/86
[52] U.S. Cl. ...................................... 429/44; 429/218
[58] Field of Search ................... 429/40, 44, 218, 209

[56] References Cited

U.S. PATENT DOCUMENTS

| 3,607,420 | 9/1971 | Cutler | 429/13 |
|---|---|---|---|
| 3,829,327 | 8/1974 | Omori et al. | 429/218 X |
| 3,912,538 | 10/1975 | Dews | 429/44 |
| 3,925,098 | 12/1975 | Saunders | 429/218 X |
| 4,029,854 | 6/1977 | Walsh et al. | 429/27 |
| 4,115,627 | 9/1978 | Christner | 429/44 |
| 4,167,607 | 9/1979 | de Nora | 429/40 X |
| 4,185,145 | 1/1980 | Breault | 429/44 X |

*Primary Examiner*—Charles F. LeFevour
*Attorney, Agent, or Firm*—Rene' E. Grossman; James T. Comfort; Melvin S. Sharp

[57] ABSTRACT

An improved fuel cell electrode comprising a graphite felt substrate having a thin vapor deposited graphite film coating the exterior fiber surfaces and a perforated metallic backing plate having one surface coated with a noble material such as platinum.

3 Claims, 4 Drawing Figures

GRAPHITE FELT FLOWTHROUGH ELECTRODE FOR FUEL CELL USE

This is a division of application Ser. No. 939,010, filed Sept. 1, 1978, now abandoned.

This invention relates to flow through electrodes for fuel cells, and more particularly, to those having carbon fiber construction bonded together by deposited carbon or graphite.

Flowthrough electrodes have heretofore been proposed for fuel cells. These have generally taken the form of compressed carbon granule electrodes, sintered graphite plates and porous metallic members. However, each of the types heretofore proposed have been characterized by one or more of the following drawbacks: excessive electrical resistance, excessive bulk, insufficient internal surface area, uncontrolled pore size, vulnerability to corrosion or high cost.

Graphite bonded fiber carbon paper electrodes have been suggested as alleviating certain of the aforementioned drawbacks, illustrative of which are those disclosed in U.S. Pat. No. 3,972,735 granted to Richard D. Breault on Aug. 3, 1976. According to the proposals therein, an electrode substrate is prepared by coating fibers of a fibrous carbon paper with vapor deposited carbon. However, it has been found that electrodes thus prepared have been insufficient in thickness and/or cross sectional density, thereby providing insufficient internal surface areas to achieve necessary levels of conversion efficiency at usable flow rates. Moreover, they have exhibited excessively high electrical resistance and, because of their thinness, have been especially vulnerable to breakage. Accordingly, the search has continued for constructions exhibiting higher cross sectional densities and effective internal surface areas while at the same time exhibiting lower electrical resistance, increased conversion efficiencies, and increased mechanical strength.

Unexpectedly, I have discovered that a carbon mat material with an initial porosity of 98% and fiber volume of about 2% makes a satisfactory electrode material following vapor deposition of graphite and when suitably contacted with a current carrying conductor.

It is one general object of this invention to improve carbon or graphite fuel cell electrodes.

It is another object of this invention to improve conversion efficiencies of such electrodes.

It is yet another object of the invention to reduce electrical resistance in carbon or graphite fuel cell electrodes.

It is still a further object of this invention to provide an improved structure whereby carbon or graphite fuel cell electrodes of the hereinabove mentioned type may be readily connected to external electrical circuits.

Accordingly, in accordance with one feature of the invention, a carbon felt material having a substantially greater thickness than paper is chosen thereby contributing to the achievement of reduced electrical resistance and increased conversion efficiency.

In accordance with yet another feature of the invention, the fibers of the aforementioned felt material are joined together by graphite, thereby increasing electrical conductivity between the fibers thereof.

In accordance with still another feature of the invention, the internal surface area of the felt material, together with the sizes of the interstices is selected within a predetermined range such that the material, in cooperative association with the remaining fuel cell elements, achieves unexpected improvements in performance.

These and other objects and features of the invention will be apparent from the following detailed description, by way of example, with reference to the drawing in which.

Figure 1:
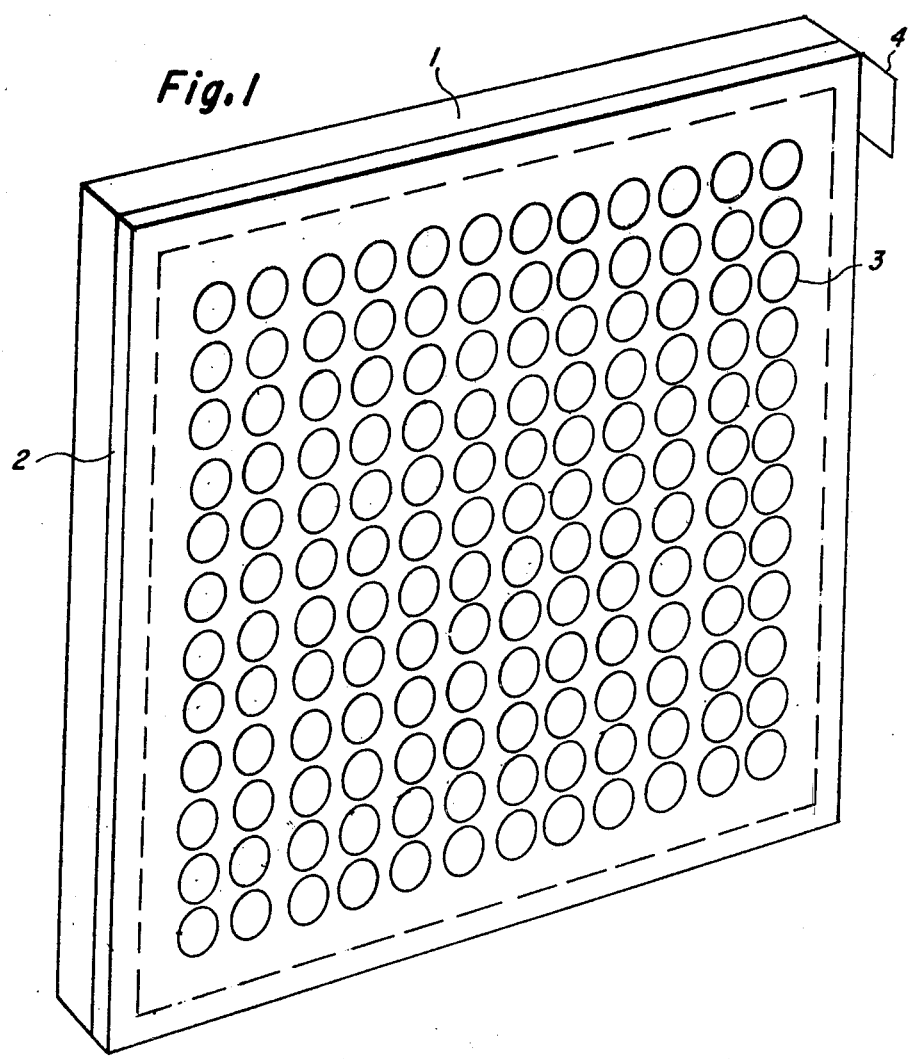
FIG. 1 is a perspective view depicting an electrode in accordance with one embodiment of the invention.

Now referring more particularly to FIG. 1, it will be observed that it includes a graphite felt member 1 in assembly with a platinum coated tantalum plate 2, the latter being configured with a plurality of perforations 3 disposed within plate 2 so as to provide a ratio of perforations to overall area of approximately 50%. Also shown is tab 4 which may be employed to provide suitable alignment with a mating recess 5 of FIG. 2.

Figure 2:
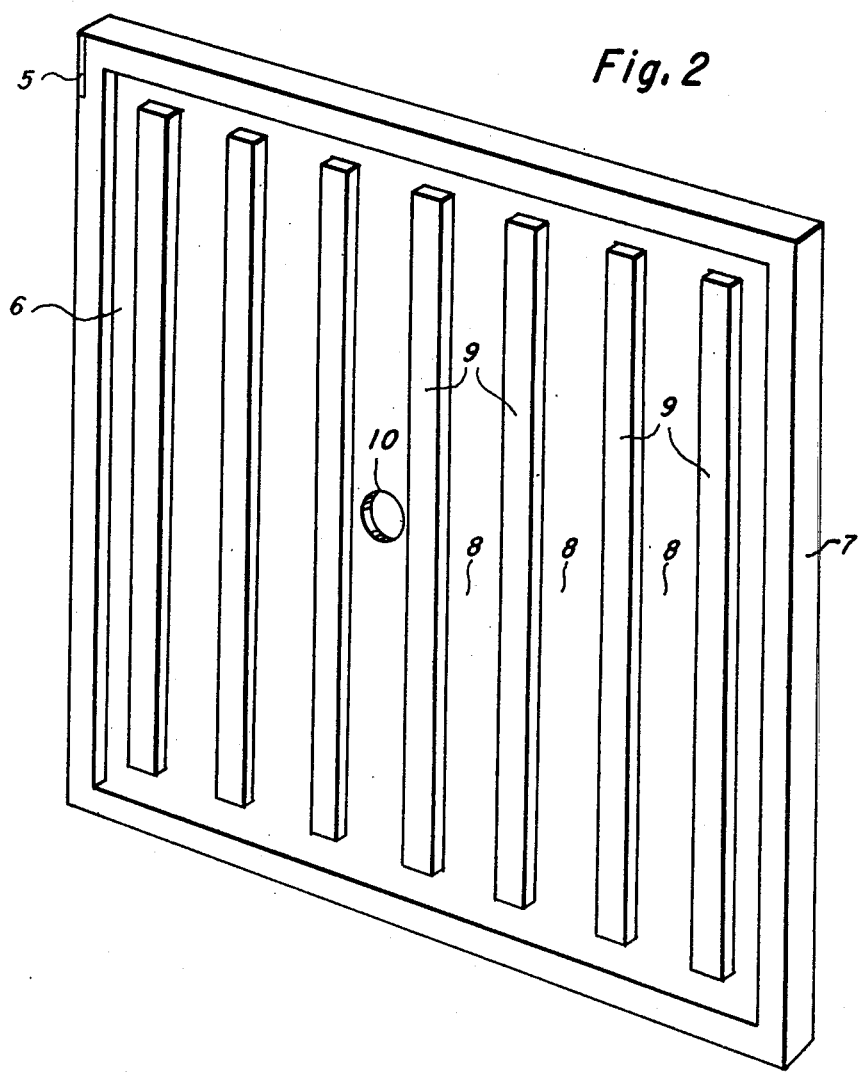
FIG. 2 is a perspective view depicting a plate which is adapted for providing contact and support for the electrode of FIG. 1.

The supporting member in FIG. 2 depicts the aforementioned recess 5 within continuous wall member 6. Peripheral wall member 7 may either be integrally fabricated with wall 6 or may be fabricated separately and welded or otherwise hermetically sealed to wall 6. In any event, the thickness of frame 7 is seen to be significantly greater than that of wall 6 in order to provide recessed areas 8 existing between vertically disposed extensions 9. Extensions 9 may also be fabricated integrally with wall 6 or may be made separately and fixedly attached thereto.

Further reference to FIG. 2 discloses an aperture 10 extending through wall 6 and providing a means for introducing a fluid into the enclosed volume resulting when the composite electrode of FIG. 1 is joined to the supporting member of FIG. 2.

Members 9 insure that the composite electrode is well supported across its surface, with the spans between members 9 being sufficiently small so as to prevent bowing.

Figure 3:
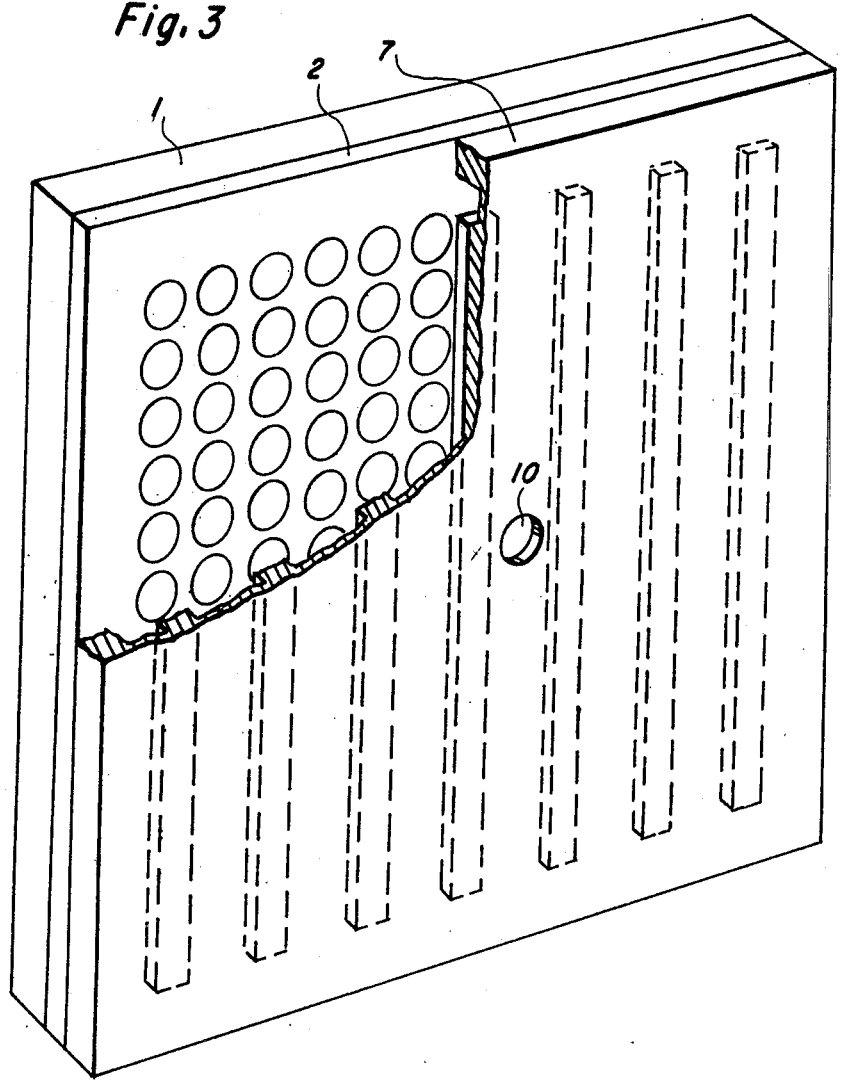
FIG. 3 is a perspective view depicting the electrode of FIG. 1 and the supporting plate of FIG. 2 when assembled together.

FIG. 3 depicts members of FIGS. 1 and 2 when assembled together.

Now returning to further consideration of the composite electrode, the graphite felt portion 1 is prepared from fibrous carbon material such as pitch mat or veil mat manufactured by Union Carbide Company. Suitable thickness is in the range of from 40 to 100 mils although dimensions beyond this range may be employed at some sacrifice. Thus, if made too thin, the finished material becomes fragile and susceptible to breakage. On the other hand, thickness greater than 100 mils increases pumping loads for the gas or liquid flowing therethrough with no significant increase in electrode efficiency. Mat or veil material of the type hereinabove mentioned should range in fiber density from about 2 to 10 percent.

After selection of material having the aforementioned properties is made, the material is then subjected to vapor deposition of graphite by known methods until a coating is produced bonding the exterior and interior fibers together. Typically, this involves cracking a suitable substance (e.g., natural gas) at high temperature in vacuum and impregnating the mat material with the resulting carbon atoms and molecules. Alternatively, the mat material may be impregnated with a suitable resin followed by pyrolysis of the resin impregnated mat at high temperature (>1000° C.) in an inert atmosphere.

The perforated plate 2 may be a thin plate of tantalum on which there has been deposited (e.g., by sputtering) a very thin coat of platinum. Representative dimensions of thickness for the tantalum and platinum coatings are approximately 0.025 cm and 300 Å, respectively. The tantalum plate may be fabricated by machining or punching, and the platinum coating may be applied by any of the conventional and well known methods of deposition.

After fabrication, the tantalum plate 2 is assembled together with the flowthrough electrode 1 so as to form a composite as depicted in FIG. 1. Assembly may be by pressing the two together or may be accomplished when assembled inside a fuel cell by pressure exerted from adjacent fuel cell structural members.

Because of the fibrous nature of the felt material, as large a contact area as possible is desirable for reduction in electrical resistance. The perforated platinum coated tantalum member 2 (or in an alternate embodiment, a perforated graphite plate instead of the perforated tantalum plate) maximizes the contacted area of the felt material, thereby decreasing the contact resistance and contributing to the overall conductivity of the assembly.

Resistivity of the felt material should be in the range of from 0.003 to 0.01 ohm-centimeters. Density should be in the range of from 0.5 to 1.0 grams per cubic centimeter, and porosity should lie in the range between 50 to 75 percent. If greater than 75 percent, there tends to be a loss in strength, whereas less than 50 percent involves significant increase in pumping loads.

It has been found that, surprisingly, the perforated nature of the plates does not seriously disrupt the flow patterns of solutions through the electrode in the electrochemically active regions. The thin nature of the assembly minimizes the overall thickness compared to configurations of the prior art.

The exterior of the fuel cell may be of any suitable conventional substance as taught by the prior art. However, it may also efficaciously include certain portions machined or otherwise fabricated from graphite. Where graphite material is selected for a portion of the fuel cell having contact with the above described electrode assembly, the cell itself can be further simplified in that the graphitic portion can serve as a current collector, thereby eliminating one otherwise required electrical conductor from the overall system. Thus, if the cell body wall and ribs are made of a conducting material such as graphite, then the platinum coated tantalum plate can be replaced with a perforated graphite plate in contact with the graphite body. Alternatively, the platinum coated tantalum plate or graphite plate could be eliminated entirely if the portion of the fuel cell body made from graphite is made directly to contact the graphite felt material over a sufficiently large area.

The principles of the invention are further illustrated by the following examples:

EXAMPLE 1

A cell was constructed having a 1 square inch projected surface area flowthrough electrode with contact being made with a platinum coated tantalum ring at the edges. The flowthrough material was prepared from a pitch mat material with a 2% fiber volume. The material was uncompressed and graphitized until the density was 0.79 grams per cubic centimeter and the porosity was 61%. The flowthrough material was 115 mils thick.

A solution of 0.02 Molar $I_2$, 0.5 Molar KI and 2 Molar $H_2SO_4$ was flowed through the electrode at a flow rate of 6.5 milliliters per minute. The potential of the electrode was held at the mass transport limited portion of the current-potential curve for the reduction of $I_2$ to $I^-$. The solution passing through the electrode was collected and analyzed for $I_2$. The results indicated that more than 94% of the $I_2$ had been reduced.

Those skilled in the art will recognize the conversion efficiency is not a function of concentration but depends on the electrode charcteristics and solution flow rates. Higher solution concentrations will yield similar conversion efficiencies. The solution flow rate in this example is considerably higher than normally employed in operating fuel cells and batteries.

EXAMPLE 2

A flowthrough electrode was prepared from veil mat material. The material was compressed during graphite deposition to a fiber volume of 10%. The density of the finished material was approximately 1 gram per cubic centimeter and the thickness was 40 mils. This electrode was then assembled in a fuel cell which otherwise was similar to that described under Example 1 above. A solution of 0.02 Molar $I_2$, 0.5 Molar KI and 2 Molar $H_2SO_4$ was flowed through the electrode at 8 milliliters per minute. The potential was held at the convection limited current of the current-potential curve for reduction of $I_2$. The concentration of $I_2$ in the solution passing through the electrode was measured. The results indicated that the conversion efficiency was greater than 0.94 (1=100%).

EXAMPLE 3

Figure 4:
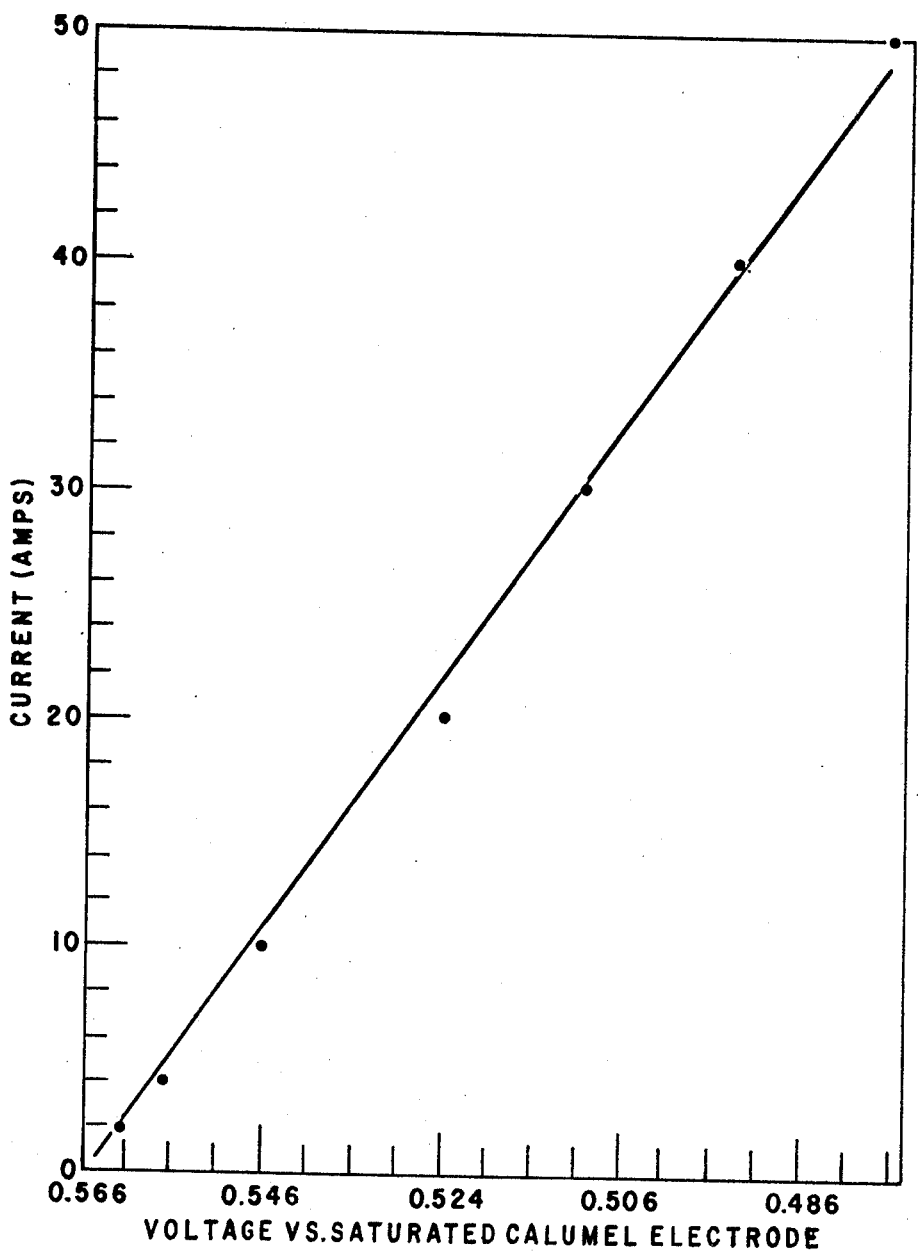
FIG. 4 is a graph depicting a current/voltage characteristic of a flowthrough electrode versus a reference electrode in accordance with the invention.

A cell was constructed similar to Example 1 with the following differences. The projected electrode area was approximately 16 square inches. The effective electrode assembly resistance measured 0.002 ohms. Density was in the range of from 0.86 to 0.92 grams per cubic centimeter. Solution of 1 Molar $Br_2$ in 48% HBr was introduced at a flow rate of 26 milliliters per minute. Measured characteristics are depicted in the graph of FIG. 4.

It will now be evident that through the practice of the above described concepts, marked improvements result, thus contributing to the attractiveness of fuel cells in commercial embodiments.

Although the aforementioned description illustrates the invention as involving the use of veil or mat carbon material with deposited graphite, it will be evident to those skilled in the art that other similar materials could readily be employed without departing from the scope and principles of the invention.

The words of expression employed are intended as terms of description and not of limitation, and there is no intention in the in the use thereof of excluding any equivalents, but on the contrary, it is intended to include any and all equivalents, adaptations and modifications that may be employed without departing from the spirit and scope of the invention.

What is claimed is:

1. A porous graphitized fuel cell electrode comprising:

(a) a fibrous graphite member having a thickness of about 40 mils to about 100 mils, a fiber density from about 2 percent to about 10 percent, and a resistivity from about 0.003 to 0.01 ohm-centimeters, and graphite material interconnecting the fibers of said member to provide a finished density of about 0.79 grams per cubic centimeter to about 1.0 gram per cubic centimeter and a porosity from about 50 percent to 75 percent;
(b) a plate connected to the graphite member, said plate having a plurality of perforations disposed to provide a ratio of perforations to overall area of about 50 percent; and
(c) a supporting member attached to the plate, said supporting member having a frame, a wall mounted within said frame, said frame having a thickness substantially greater than the wall thickness to provide a recessed area said wall, frame, and perforated plate forming a plurality of spaced elongated extensions formed on the wall for strengthening the wall against bowing, and an aperture in said wall for introducing fluid into the volume.

2. A porous graphitized fuel cell electrode according to claim 1 wherein the plate and support member further include coacting alignment means for aligning the plate and support member.

3. A porous graphitized fuel cell electrode according to claim 1 wherein the plate is a platinum coated tantalum plate, said plantinum coating having a thickness of about 300 Å and said tantalum plate having a thickness of about 0.025 cm.

* * * * *